Oct. 25, 1960  L. F. MATTI  2,957,674
DISPENSING DEVICE

Filed Sept. 4, 1958  6 Sheets-Sheet 1

INVENTOR
Leo F. Matti
by Carlson, Pitzner, Hubbard & Wolfe
ATTORNEYS

Oct. 25, 1960 L. F. MATTI 2,957,674
DISPENSING DEVICE
Filed Sept. 4, 1958 6 Sheets-Sheet 2
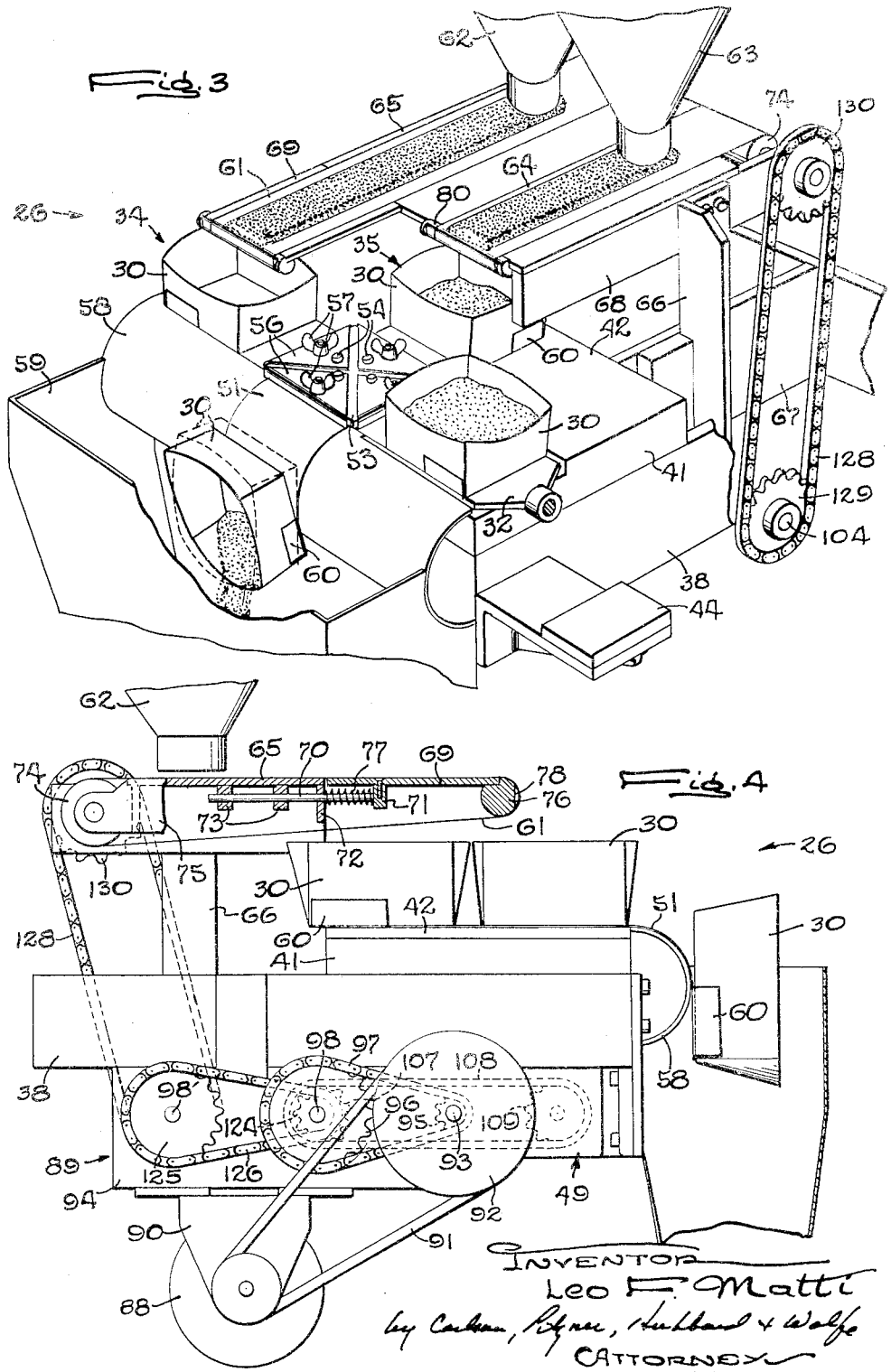
INVENTOR
Leo F. Matti
by Carlson, Pfree, Hubbard & Wolfe
ATTORNEYS

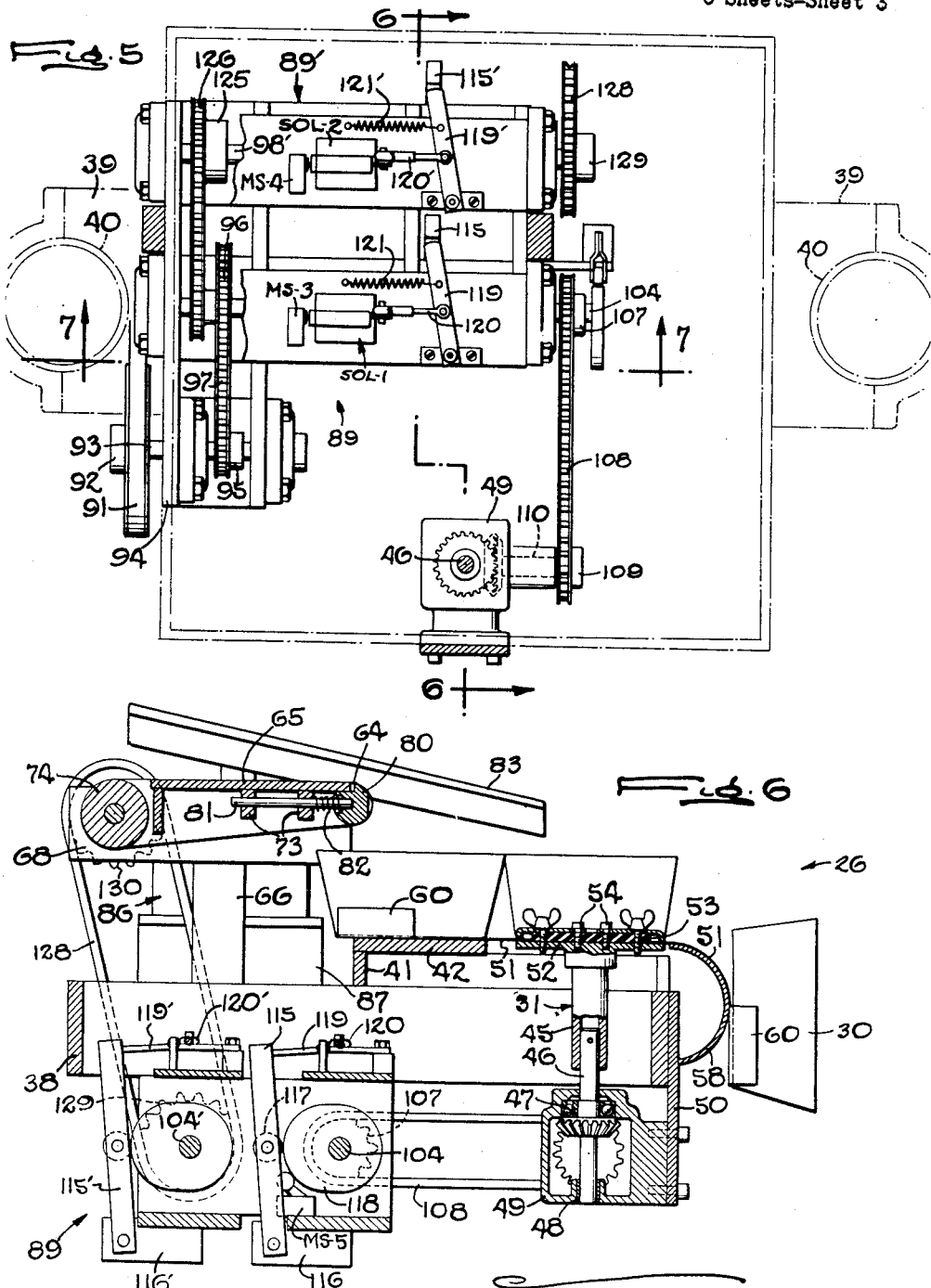

Oct. 25, 1960 L. F. MATTI 2,957,674
DISPENSING DEVICE
Filed Sept. 4, 1958 6 Sheets-Sheet 4
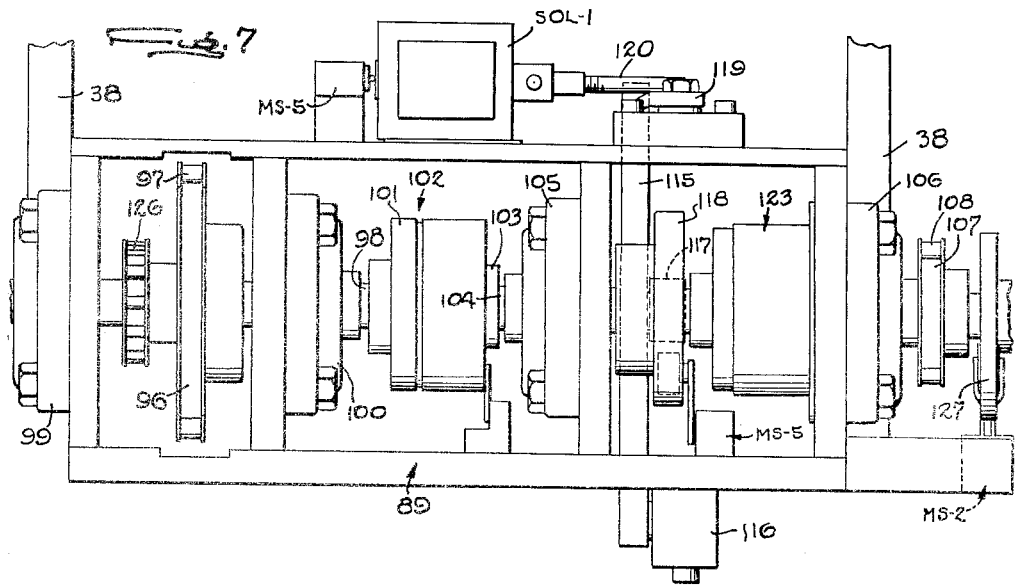
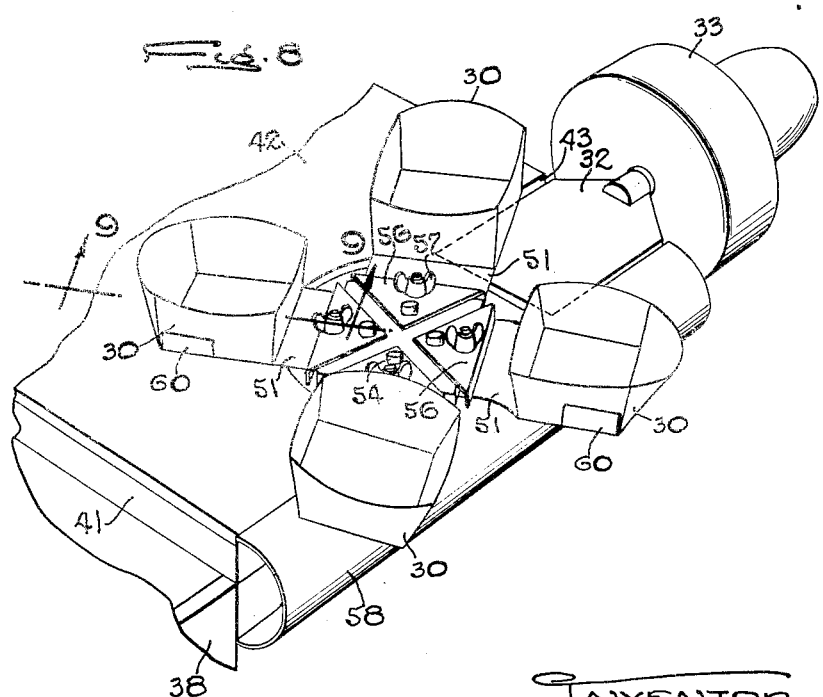
INVENTOR
Leo F. Matti
by Carlson, Pitzner, Hubbard & Wolfe
ATTORNEYS Oct. 25, 1960        L. F. MATTI        2,957,674
DISPENSING DEVICE
Filed Sept. 4, 1958        6 Sheets-Sheet 5
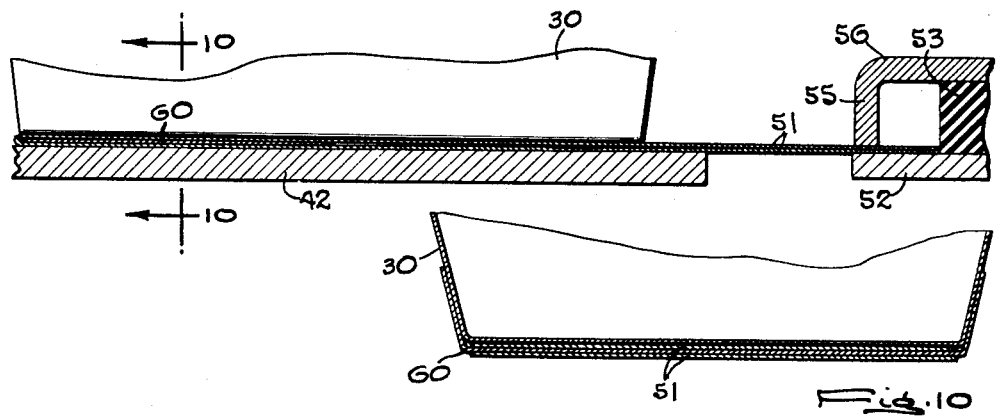
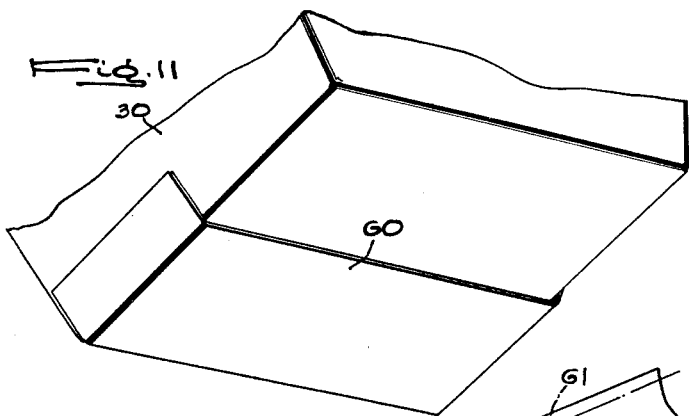
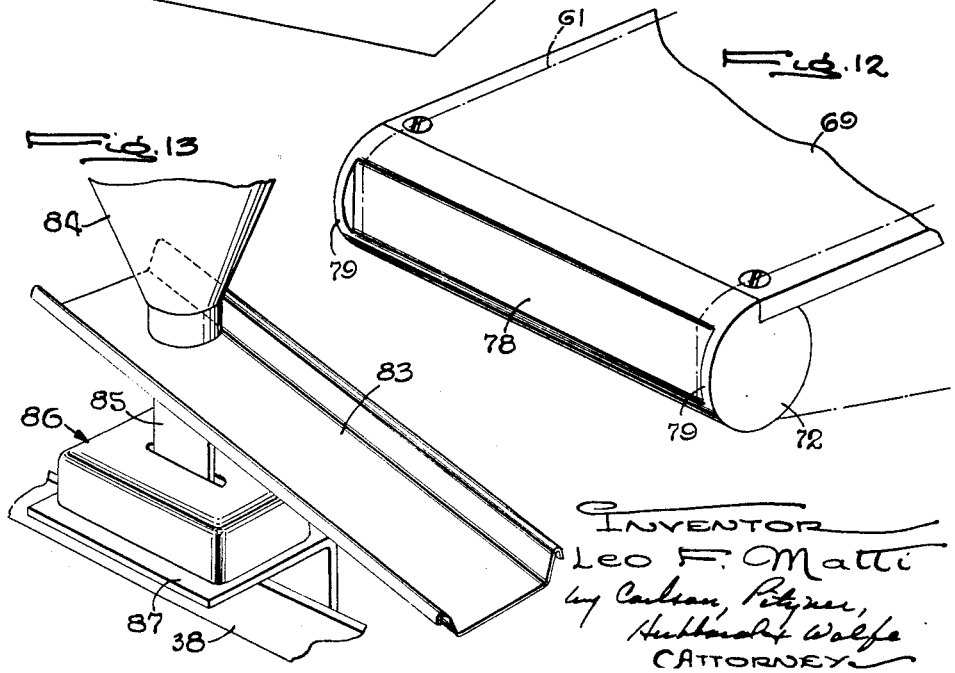
INVENTOR
Leo F. Matti
by Carlson, Pitzner,
Hubbard & Wolfe
ATTORNEY Oct. 25, 1960

L. F. MATTI 2,957,674

DISPENSING DEVICE

Filed Sept. 4, 1958

INVENTOR
Leo F. Matti
by Carlson, Pitzner, Hubbard & Wolfe
ATTORNEY

United States Patent Office 2,957,674
Patented Oct. 25, 1960

2,957,674

DISPENSING DEVICE

Leo F. Matti, Rockford, Ill., assignor, by mesne assignments, to Bartelt Engineering Company, Inc., Rockford, Ill., a corporation of Delaware Filed Sept. 4, 1958, Ser. No. 759,057

14 Claims. (Cl. 249—18)

This invention relates to a dispensing device and particularly to the type in which a quantity of material to be packaged is measured out by weight and is deposited in a container such as a bag.

The general object of the invention is to provide a new and improved dispensing device of the above character which measures the material accurately yet is capable of operating at comparatively high speeds.

The principal object is to achieve the foregoing by providing a novel arrangement in which the material may be deposited in receptacles at succeeding stations with the receptacle resting on a weighing scale platform at the final station so that the measuring of the material may be done in stages to achieve high speed and still maintain the accuracy of the ultimate weighing of the material.

A more detailed object is to mount the receptacles on a turret with the stations angularly spaced around the axis of the turret and to connect the receptacles to the turret by an element which is flexible to permit each receptacle to rest freely on the scale platform at the final station and thereby obtain an accurate indication of weight.

Another object is to utilize the weighing scale to control the filling and indexing of the receptacles in such a way as to eliminate the chance of the dispensing device delivering a charge of material which is not of the proper weight.

The invention also resides in the novel construction and arrangement of the flexible element connecting the receptacles and the turret and the manner of using this element to empty the receptacles.

Other objects and advantages of the invention will become apparent from the following detailed description taken in connection with the accompanying drawings, in which:

Fig. 3 is a fragmentary perspective view of another portion of the device.

Fig. 4 is a fragmentary sectional view taken along the line 4—4 in Fig. 1.

Fig. 5 is a sectional view taken along the line 5—5 in Fig. 1.

Fig. 6 is a sectional view taken along the line 6—6 in Fig. 5.

Fig. 7 is an enlarged fragmentary sectional view taken along the line 7—7 in Fig. 5.

Fig. 8 is a fragmentary perspective view showing the mounting of the receptacles in which the material is measured.

Fig. 9 is an enlarged fragmentary sectional view taken along the line 9—9 in Fig. 8.

Fig. 10 is fragmentary sectional view taken along the line 10—10 in Fig. 9.

Fig. 11 is a fragmentary perspective view of the bottom of one of the receptacles.

Fig. 12 is an enlarged fragmentary perspective view of the support for one of the belts used to deposit material in the receptacles.

Fig. 13 is a fragmentary perspective view of the vibratory feeder used to deposit material in the receptacles.

Figure 1:
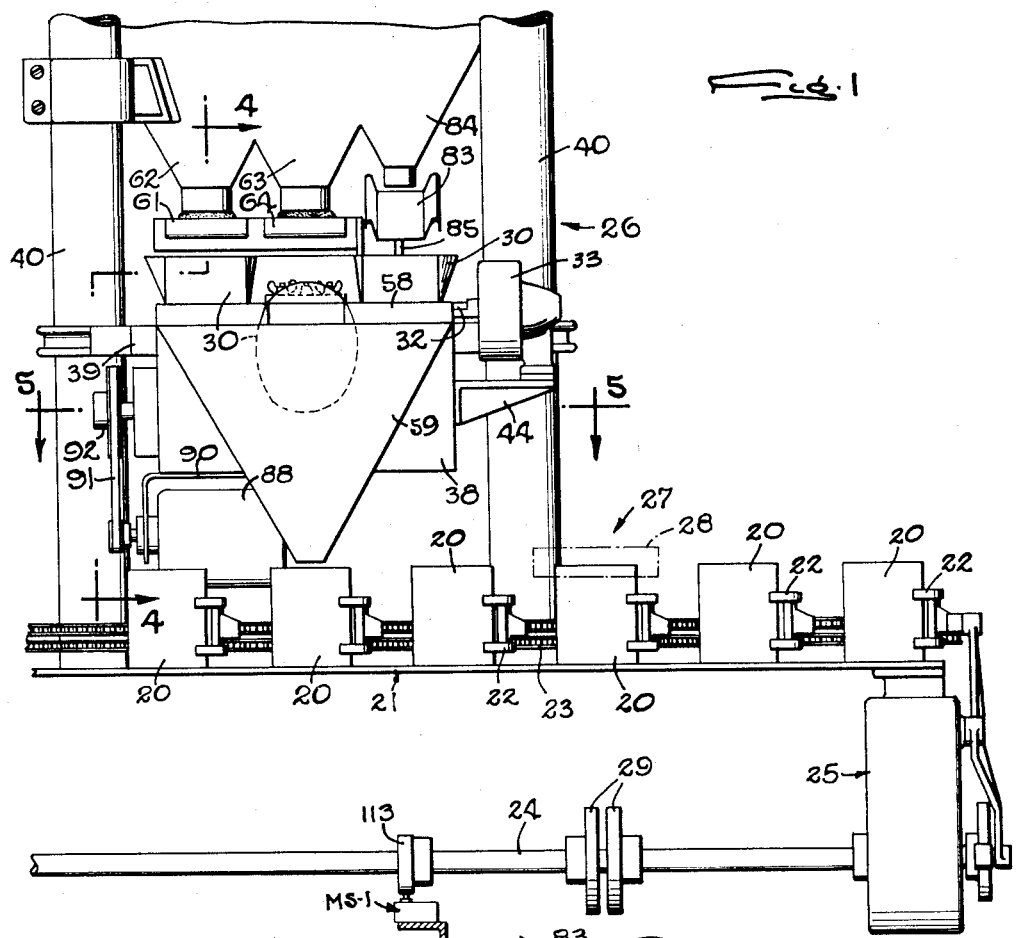
Figure 1 is a fragmentary front elevation of a packaging machine employing the novel dispensing device of the present invention.

As shown in the drawings for purposes of illustration, the invention is embodied in a packaging machine in which a succession of bags 20 are advanced edgewise step by step along an elongated horizontal base 21. The bags are gripped at their leading edges by clamps 22 which are carried by and spaced along an endless chain 23. The latter is supported on the base 21 and is driven by a continuously rotating horizontal camshaft 24 through a conventional Geneva mechanism 25 which imparts an intermittent motion to the chain and hence to the bags.

Each bag 20 first is delivered open end up to a position beneath a dispensing device 26 which, during a dwell of the bag, deposits a measured quantity of the material to be packaged in the bag. The bag then is indexed to a position 27 where the mouth of the bag is sealed closed. This may be a conventional heat sealing operation performed by heated shoes 28 which are swung in the usual manner into engagement with the bag in timed relation to the advance of the chain 23 by cams 29 on the shaft 24, the bags for this purpose being made of or coated with a heat sealable material. At the end of the machine, the clamps are opened to release the bag.

In accordance with the present invention, the dispensing device 26 is constructed and arranged in a novel manner so that it discharges the measured quantities of material accurately according to weight and at comparatively high speeds. To these ends, the charges of material are carried in receptacles 30 (Fig. 2) which constitute a part of a turret 31 so that the receptacles are moved around the vertical axis of the turret through successive stations. During such movement, a quantity of material less than the desired amount first is deposited in a receptacle by a high speed operation such as by volumetric measuring of the material. The receptacle then is moved to a station in which it rests on the platform 32 of a weighing scale 33 and material is deposited in the receptacle until the desired weight has been reached. Finally, the material in the receptacle is discharged into one of the bags 20.

In the present instance, there are four receptacles 30 and hence four stations 34, 35, 36 and 37 (Fig. 2) and each receptacle is in the form of a relatively shallow square pan made of sheet metal. The first two stations 34 and 35 are utilized for the initial filling and the scale platform 32 is located at the third station 36 where the charge of material in each pan is brought up to the proper weight. At the fourth station 37, the pan is tipped to empty its contents into a bag.

The dispensing device 26 may, as shown in the drawings, be mounted on a rectangular frame 38 and blocks 39 (Figs. 1 and 5) secured to the sides of this frame are clamped to posts 40 upstanding from the main frame 21 of the packaging machine. On top of the frame 38 is a smaller rectangular frame 41 and a horizontal plate 42 is secured to the top of the latter to support the pans 30 as they are advanced through the first two stations 34 and 35. At the third station 36, the plate 42 is cut away as indicated at 43 (Fig. 8) and replaced by the scale platform 32 which is level with the plate. The head of the scale 33 is supported on a bracket 44 (Fig. 3) which is welded to the side of the frame 38 near the front thereof.

Herein, the pans 30 are angularly spaced around and connected to the upper end of a vertical hollow shaft 45 (Fig. 6) which telescopes with and is pinned to a second shaft 46. The latter is journaled in bearings 47 and 48 in a gear box 49 which is bolted to a vertical plate 50 depending from the front of the frame 38.

In order that the pans 30 may rest freely on the platform 32 whereby the scale 33 may give an accurate measure of the weight of the material in the pans, each pan is connected to the shaft 45 by an element 51 which flexes vertically but, at the same time, transmits the rotary motion of the shaft to the associated pan. Preferably, the elements 51 are in the form of nylon belts which are fastened at one end to the undersides of the pans and at the other end to the shaft 45. To fasten the belts to the shaft, a flat square plate 52 (Fig. 6) is welded to the top of the shaft and a smaller block 53 of rubber is held on top of this plate by screws 54. As shown in Fig. 9, the inner end of each belt 51 abuts against one edge of the block 53 and is clamped against the margin of the plate 52 by the flange 55 of a triangular clamping member 56. The latter is tightened down against the belt by a wing screw 57 which projects through the member and the block and is threaded into the plate and the clamping member is held against turning by the head of one of the screws 54 which projects loosely through the member.

Advantage is taken of the flexible belts 51 to effect the tipping of each pan 30 automatically as an incident to the indexing of the pan to the station 37. For this purpose, the latter station is beyond the edges of the plate 42 and the platform 32 so that, as the pan is advanced from the third station to the fourth, it rides off the scale platform and is suspended by the belt. In so doing, the pan tips through 90 degrees and the contents flow out by gravity. The outer edge of each pan may be bowed outwardly as shown in the drawings to facilitate the flow of material out of the pan.

Figure 2:
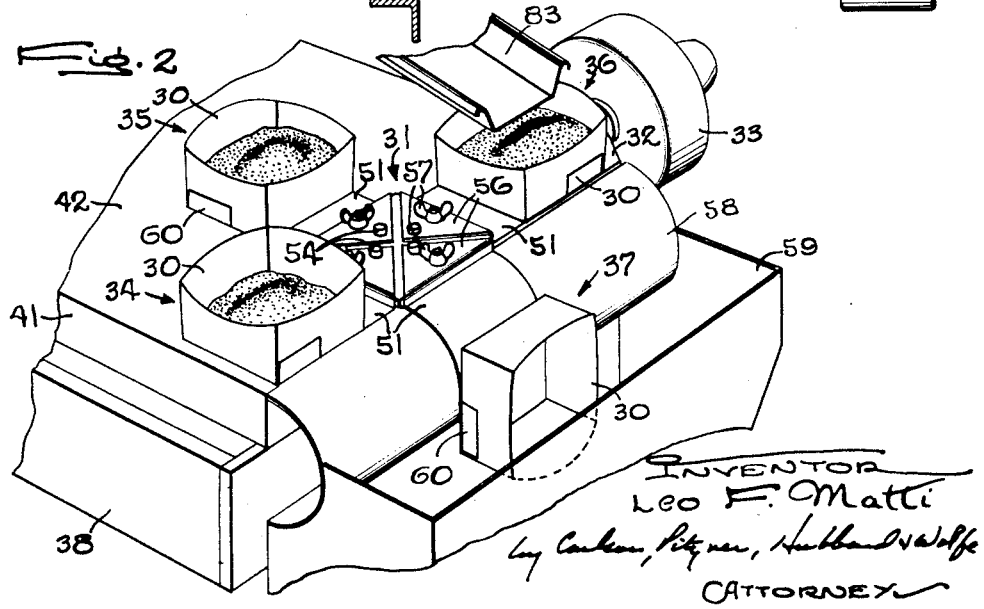
Fig. 2 is a fragmentary perspective view of a portion of the dispensing device.

Means is provided for controlling the tipping of the pan 30 as it is advanced to the station 37 so that the pan tips evenly and spills the material in a comparatively smooth flow. Herein, this means comprises a semicylindrical guide 58 extending horizontally across the front of the frame 38 as shown in Fig. 2 with the upper edge level with the plate 42. Thus, as the pan rides off the scale platform 32 and onto the guide 58, it begins to tip downwardly and toward the center of the guide (see Fig. 8). As the pan moves further, it continues to tip until it is hanging vertically at the station 37. During such tipping, the material spills from the pan and is guided to a bag 20 by a funnel 59 which is rectangular in cross section and is secured to the frame 38 along the guide 58.

To cause the pan 30 to tip more freely and empty its contents completely, the belt 51 is attached to the pan in such a manner that it follows accurately the contour of the guide 58 as it turns from the third station to the fourth. As shown most clearly, in Figs. 4, 9, 10 and 11, the belt is attached to the outer half of the pan bottom and merely underlies the pan along the inner half. This is achieved by adding a sheet metal strap 60 to the bottom of the pan across the outer half thereof. The strap is spaced slightly from the pan bottom and the belt is doubled thickness and is looped around the strap with the free ends held by the clamp 56. With this arrangement, the pan is generally tangential to the guide 58 as it moves to the discharge position and tips evenly and smoothly. Also, when the pan reaches this position, the momentum tends to swing the pan slightly beyond the vertical as shown in full lines in Fig. 4 and this insures complete emptying of the pan.

In the form of the invention illustrated in the drawings, the volumetric filling of the pans 30 is effected at both of the first two stations 34 and 35, similar arrangements being used at these stations. Thus, at the station 34, an endless belt 61 is disposed beneath a hopper 62 and has a horizontal run extending out over the pan at this station. The material in the hopper stands in a column on the belt when the latter is stationary and, as the belt moves forward, it carries a ribbon of material to the pan. The amount of material delivered to the pan depends upon the length of time the belt runs and the distance the hopper is spaced above the belt. A hopper 63 and a shorter belt 64 are disposed next to the hopper 62 and the belt 61 and similarly deliver measured quantities of material to the pan at the station 35.

To support the belts 61 and 64, a rectangular plate 65 is disposed horizontally beneath the hoppers 62 and 63 and is mounted on the frame 38 by means of an upright post 66 which is welded at its lower end to a cross bar 67 of the frame and at its upper end to a bar 68 secured to one edge of the plate. An extension plate 69 is disposed in front of the plate 65 along the half which is alined with the hopper 62 and projects out over the pan at the station 34. The extension plate is fastened to the main plate by pins 70 (Fig. 4) which project rearwardly from a block 71 fastened to the underside of the extension plate and which project through a bar 72 and blocks 73 on the underside of the main plate.

Spanning the back of the plate 65 is a drive roller 74 which is journaled in an extension of the bar 68 and in a similar bar 75 (Fig. 4) at the other edge of the plate. Fastened to the front edge of the extension plate 69 is a roll 76 and the belt 61 extends around the driver roller 74, across the plates 65 and 69, around the roll 76 and back to the drive roller. Compression springs 77 encircle the pins 70 and act between the bars 71 and 72 to urge the extension plate outwardly and tighten the belt.

As shown in Fig. 12, a flat 78 is cut on the front of the roll 72 and stops short of the ends of the roll to leave margins 79 which prevent the belt from riding off the extension plate.

A roll 80 (Fig. 6) similar to the roll 72 is disposed along the portion of the front edge of the plate 65 which is alined with the hopper 63 and the belt 64 extends around the driving roller 74, across the plate 65, around the roll 80 and back to the driving roller. The roll 80 is mounted in place by pins 81 which, like the pins 70, project back through the blocks 73 and a compression spring 82 acting between the forward block and the roll urges the latter outwardly to tighten the belt 64. The belt 64 is mounted by removing the extension plate 69, the pins 70 simply sliding out of the blocks 73 and the bar 72, and by sliding the belt across the plate 65 and into position. The extension plate then is replaced and the belt 61 is mounted.

The final delivery of material to the pan 30 at the station 36 to bring the charge of material up to exact weight is effected by a vibratory feeder which includes a generally horizontal trough 83 (Figs. 6 and 13) extending from underneath a hopper 84 to a point over the pan at the station 36 and inclined slightly downwardly toward the pan. The rear end of the trough is supported on the upper end of a vertical blade 85 which projects down into a conventional vibrator 86. The latter is mounted on an angle bracket 87 which is welded to the side of the frame 38. As will be explained later in detail, the vibrator responds to the scale 33 so that material from the hopper 84 is vibrated along the trough 83 and into the pan at the station 36 until the pan holds the correct weight of material at which time the vibrator is shut off.

To index the pans 30, the shaft 46 of the turret is turned by a motor 88 (Fig. 4) through an indexing mechanism 89 (Figs. 5, 6 and 7) which produces a step by step motion. The motor is mounted on a bracket 90 suspended on the underside of the frame 38 and, through a belt 91, drives a pulley 92 fast on a shaft 93 (Fig. 5). The latter is journaled on a bracket 94 also rigid with the frame and, through sprocket wheels 95 and 96 and a chain 97, drives a horizontal shaft 98 journaled in bearings 99 and 100 on the frame 38. The pulley 92 and the wheels 95 and 96 are sized to produce a speed reduction between the motor and the shaft 98. One element 101 of an electromagnetic clutch 102 is fast on the end of the shaft 98 and cooperates with the other clutch element 103 which is secured to the end of an alined shaft 104 journaled in bearings 105 and 106 on the frame 38. The outer end of the shaft 104 carries a sprocket wheel 107 which is connected through a chain 108 (Fig. 5) to a sprocket wheel 109 on the imput shaft 110 of the gear box 49 thus completing the drive from the motor 88 to the turret 31.

Figure 14:
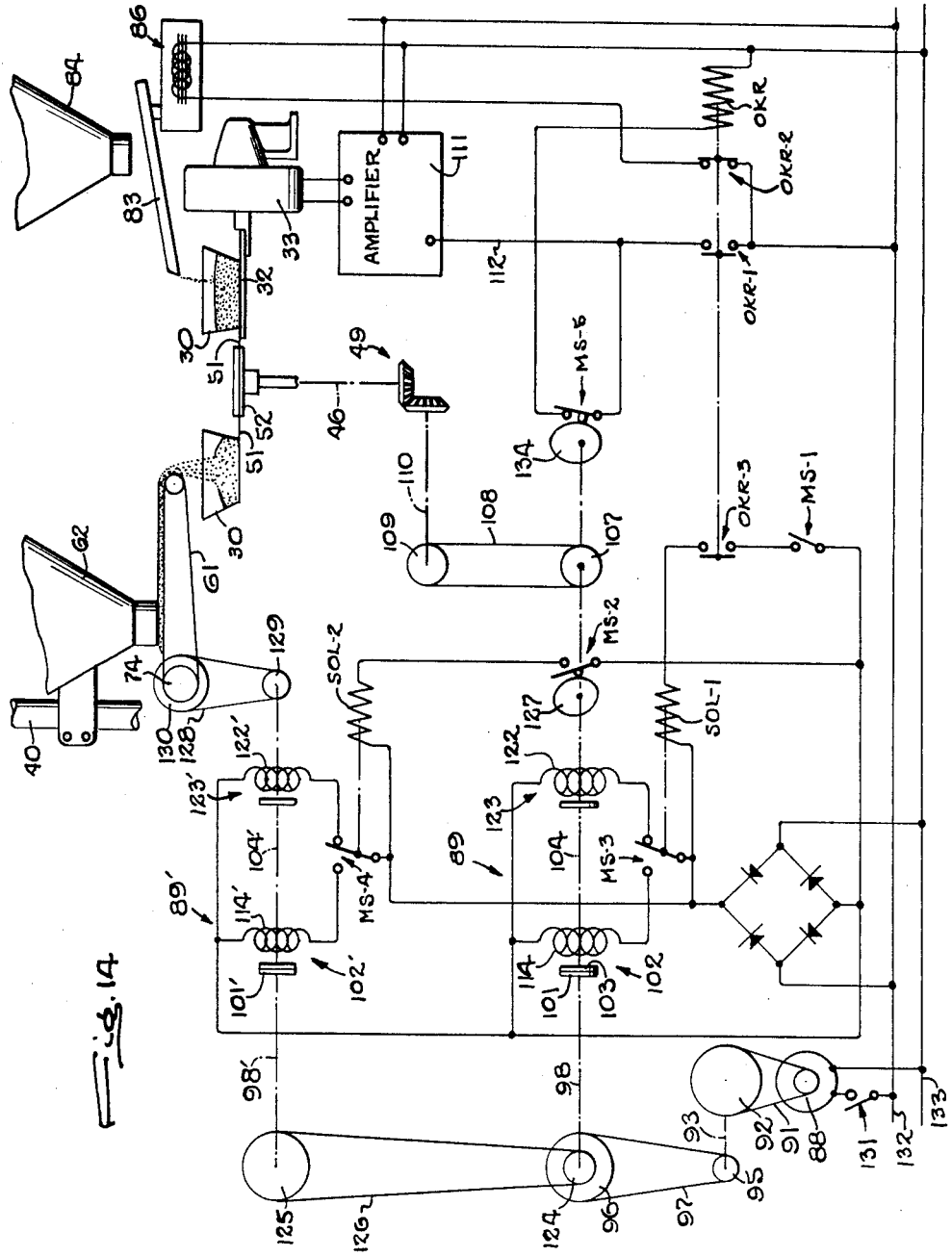
Fig. 14 is a wiring diagram of the circuit used to control the dispensing device, parts of the device being shown schematically.

Means is provided for energizing the clutch 102 in timed relation with the advance of the bags 20 to index the turret 31 one step and then to deenergize the clutch. Herein, this means includes a solenoid SOL-1 which responds both to the advance of the bags and to the weighing scale 33 so that the pan turret is indexed at the proper time and then only if the proper amount of material has been deposited in the pan at the station 36. To these ends, solenoid is energized by a relay OKR which, in turn, responds to the weighing scale. Thus, the signal from the head of the scale provides the input to an amplifier 111 (Fig. 14) whose output is through the lead 112 and the normally closed contacts of a switch MS-5 to the relay OKR. When energized, the latter closes a holding circuit through contacts OKR-1 and closes contacts OKR-3 in the circuit of the solenoid SOL-1. Simultaneously, the relay opens contacts OKR-2 in the circuit of the vibrator 86. Accordingly, when the material in the pan 30 at the station 36 reaches the desired weight, the vibrator 86 is shut off to stop the feed of material to the pan and the circuit of the solenoid SOL-1 is conditioned to be energized in response to the advance of the bags 20.

With the circuit of the solenoid SOL-1 conditioned as described above, the circuit is completed by closing a switch MS-1. This switch is actuated by a cam 113 on the main camshaft 24 (Fig. 1) so that the solenoid is energized when an empty bag dwells beneath the funnel 59 if the material in the pan at the station 36 is of the proper weight. When the solenoid SOL-1 is energized, it closes a switch MS-3 in the circuit of the coil 114 of the clutch 102 which thereby is engaged and causes the shaft 104 to rotate and turn the turret 31.

The shaft 104 turns through one revolution to move the turret 31 through 90 degrees. The one revolution of the shaft is obtained through the use of an upright lever 115 (Figs. 5, 6 and 7) fulcrumed at its lower end on a block 116 secured to the frame 38 and carrying a follower roller 117 which coacts with a cam 118 on the shaft 104. A horizontal blocking lever 119 is fulcrumed on the frame and is connected by a rod 120 to the armature of the solenoid SOL-1. Normally, the blocking lever is in front of the lever 115 as shown in Fig. 5 and prevents the latter from swinging forward. When the solenoid is energized, the blocking lever is swung back out of the way of the lever 115. At the same time, the clutch 102 is engaged so that the shaft 104 turns. With the blocking lever back, the lever 115 may swing forward to permit the roller 117 to follow the cam 118 as the latter turns with the shaft 104. As the shaft begins to turn, a cam 134 on the shaft opens a switch MS-5 (Fig. 14) in the circuit of the relay OKR which thereby is deenergized. This deenergizes the solenoid SOL-1 but, with the lever 115 forward, the blocking lever 119 cannot swing back so that the armature of the solenoid remains projected and the switch MS-3 stays in position to keep the clutch energized.

When the shaft 104 completes one revolution, the cam 118 swings the lever 115 back so as to permit a contractile spring 121 to pull the blocking lever 119 back to its original position. This returns the armature of the solenoid SOL-1 and throws the switch MS-3. The latter thus deenergizes the clutch 102 and also energizes the coil 122 (Fig. 14) of an electromagnetic brake 123 which grips and stops the shaft 104 completing one indexing step of the pan turret 31.

An indexing mechanism 89' similar to the mechanism 89 is used to advance the dispensing belts 61 and 64, the corresponding parts being indicated by the same but primed reference characters. The input shaft 98' of the mechanism 89' is driven from the mechanism 89 through a sprocket wheel 124 on the shaft 98, a sprocket wheel 125 on the shaft 98' and a connecting chain 126. The clutch 102' is energized when the mechanism 89 has completed the indexing of the pans 30 and, for this purpose, a cam 127 on the output shaft 104 of the mechanism 89 closes a switch MS-2 in the circuit of a solenoid SOL-2. The latter throws a switch MS-4 to deenergize the brake 123' and energize the clutch 102'. The lever 115' and blocking lever 119' cause the output shaft 104' to turn through one revolution, the same as in the indexing mechanism 89, and this shaft drives the belts 61 and 64 through a chain 128 (Fig. 3) and sprocket wheels 129 and 130 fast on the shaft 104' and the axle of the roll 74 respectively.

A cycle of the indexing mechanism 89' is initiated upon the completion of a cycle of the indexing mechanism 89 through the switch MS-2 (Figs. 7 and 14) which is actuated by the cam 127 on the shaft 104 and closed each time the latter completes a revolution. The wheels 124 and 125 are sized to produce a 2 to 1 speed reduction whereby the cycle of the indexing mechanism 89' takes twice as long as the cycle of the indexing mechanism 89. Thus, the dispensing operation is divided into three units of time, one unit being used for indexing the pans 30 and the other two being used for filling the pans. Also, the time of the dispensing operation is slightly less than the time required for the main camshaft 24 to make one revolution so that the pan at the station 36 is full and the relay OKR is energized as a bag 20 comes to rest at the filling position beneath the funnel 59.

*Operation*

With the packaging machine in operation, a manual switch 131 (Fig. 14) has been closed to connect the motor 88 across supply lines 132 and 133 so that the input shafts 98 and 98' of the indexing mechanisms 89 and 89' are turning continuously. At a time when a bag 20 moves into the filling position, both clutches 102 and 102' are disengaged whereby the turret 31 is stationary and the belts 61 and 64 are stopped. Also, the head of the weighing scale 33 has sensed that the proper amount of material has been delivered to the pan 30 at the station 36 and has produced a signal which, through the amplifier 111 and the switch MS-5, energizes the relay OKR. This closes the contacts OKR-3 and conditions the solenoid SOL-1 for energization.

As the bag reaches the filling position, the cam 113 on the camshaft 24 closes the switch MS-1 completing the circuit of the solenoid SOL-1. The latter throws the switch MS-3 to disengage the brake 123 and engage the clutch 102. This initiates turning of the shaft 104 which, through the action of the cam 118 and the levers 115 and 119, turns through one revolution at which time the clutch is disengaged and the brake is engaged. Turning of the shaft 104 indexes the turret 31 through a quarter of a revolution and thus moves the pan 30 at the station 36 from the scale platform 32 and across the guide 58. Because of the flexible belt 51, the pan tips as it rides over the guide and the material in the pan is dumped into the funnel 59 and flows into the bag dwelling beneath the funnel.

The cam 134 on the shaft 104 opens the switch MS-5 during the indexing of the turret 31 so that the relay OKR is deenergized and the circuit of the vibrator 86 is closed. As a result, material is fed from the trough 83 as the next pan moves to the scale platform 32. Also, at the end of the revolution of the shaft 104, the cam 127 closes the switch MS-2 which completes the circuit of the solenoid SOL-2 to initiate a cycle of the indexing mechanism 89'. The latter drives the feed belts 61 and 64 to deposit an initial quantity of material in the pan at the station 34 and an additional quantity in the pan at the station 35. When the shaft 104' of the indexing mechanism 89' completes one revolution, the belts are stopped preparatory to the next advance of the pans. The vibrator 86 continues to feed material to the pan at the station 36 until the weighing scale 33 senses that this pan contains the proper weight at which time the scale produces a signal energizing the relay OKR. The latter opens the circuit of the vibrator and closes the contacts OKR-3 in the circuit of the solenoid SOL-1 and the device is conditioned for the next cycle.

It will be observed that the dispensing device of the present invention accurately delivers quantities of material of predetermined weight at comparatively high speeds. The accuracy is achieved by delivering the final amount of material to each pan while the pan is on the scale platform. By delivering the bulk of the material at previous stations, however, the device may be operated at high speeds. The flexible belts 51 which index the pans while permitting them to rest freely on the scale platform 32 permits the use of a multiple station arrangement without detracting from the accuracy of the weighing. Moreover, only accurately measured charges of material will be deposited in the bags 20. If the material in the pan at the station 36 is not up to weight when the bag reaches the filling position, the circuit of the solenoid SOL-1 will remain open through the contacts OKR-3 even after the switch MS-1 has been closed. Thus, the turret 31 will not be indexed and the bag at the filling position will move on without being filled.

I claim as my invention:

1. A device for dispensing a predetermined weight of material, said device comprising a base, a horizontal plate mounted on said base, a scale having a platform disposed next to said plate, a member journaled on said base to turn about a generally vertical axis, a receptacle resting on said plate and disposed laterally of said member, a flat, relatively wide belt having one end portion underlying and connected to the outer portion of the bottom of said receptacle and the other end portion connected to said member, said belt being flexible in a vertical direction and relatively rigid in a horizontal direction whereby the receptacle is free to move vertically relative to said member but turns with the member and moves across said plate, across said platform and off the platform, an elongated horizontal guide having a cylindrical surface and disposed alongside said platform, said receptacle riding over said guide as it leaves said platform and tipping gradually downwardly and the unattached portion of said belt being of a length to extend across the top half of the guide, a first dispenser operable to deposit a quantity of material of a weight less than said predetermined weight in said receptacle while the latter is supported on said plate, a second dispenser operable when energized to deliver material to said receptacle when the receptacle is supported by said platform, means responsive to said scale and operable to deenergize said second dispenser when said receptacle holds said predetermined weight of material, and mechanism for turning said member to move said receptacle from said plate to said platform and off the platform to receive material from said dispensers and then to tip thereby to discharge the material in the receptacle.

2. A device for dispensing a predetermined weight of material, said device comprising a base, a horizontal plate mounted on said base, a scale having a platform disposed next to said plate, a member journaled on said base to turn about a generally vertical axis, a receptacle resting on said plate and disposed laterally of said member, a flat, relatively wide belt connecting said receptacle and said member, said belt being flexible in a vertical direction and relatively rigid in a horizontal direction whereby the receptacle is free to move vertically relative to said member but turns with the member and moves across said plate, across said platform and off the platform, an elongated horizontal guide having a cylindrical surface and disposed alongside said platform, said receptacle riding over said guide as it leaves said platform and tipping gradually downwardly, a first dispenser operable to deposit a quantity of material of a weight less than said predetermined weight in said receptacle while the latter is supported on said plate, a second dispenser operable when energized to deliver material to said receptacle when the receptacle is supported by said platform, means responsive to said scale and operable to deenergize said second dispenser when said receptacle holds said predetermined weight of material, and mechanism for turning said member to move said receptacle from said plate to said platform and off the platform to receive material from said dispensers and then to tip thereby to discharge the material in the receptacle.

3. A device for dispensing a predetermined weight of material, said device comprising a base, a horizontal plate mounted on said base, a scale having a platform disposed next to said plate, a member journaled on said base to turn about a generally vertical axis, a receptacle resting on said plate and disposed laterally of said member, an element connecting said receptacle and said member, said element being flexible in a vertical direction and relatively rigid in a horizontal direction whereby the receptacle is free to move vertically relative to said member but turns with the member and moves across said plate, across said platform and off the platform, an elongated horizontal guide having a cylindrical surface and disposed alongside said platform, said receptacle riding over said guide as it leaves said platform and tipping gradually downwardly, a first dispenser operable to deposit a quantity of material of a weight less than said predetermined weight in said receptacle while the latter is supported on said plate, a second dispenser operable when energized to deliver material to said receptacle when the receptacle is supported by said platform, means responsive to said scale and operable to deenergize said second dispenser when said receptacle holds said predetermined weight of material, and mechanism for turning said member to move said receptacle from said plate to said platform and off the platform to receive material from said dispensers and then to tip thereby to discharge the material in the receptacle.

4. A device for dispensing a predetermined weight of material, said device comprising a base, a horizontal plate mounted on said base, a scale having a platform disposed next to said plate, a member journaled on said base to turn about a generally vertical axis, a receptacle resting on said plate and disposed laterally of said member, an element connecting said receptacle and said member, said element being flexible in a vertical direction and relatively rigid in a horizontal direction whereby the receptacle is free to move vertically relative to said member but turns with the member and moves across said plate, across said platform and off the platform, a first dispenser operable to deposit a quantity of material of a weight less than said predetermined weight in said receptacle while the latter is supported on said plate, a second dispenser operable when energized to deliver material to said receptacle when the receptacle is supported by said platform, means responsive to said scale and operable to deenergize said second dispenser when said receptacle holds said predetermined weight of material, and mechanism for turning said member to move said receptacle from said plate to said platform and off the platform to receive material from said dispensers and then to tip thereby to discharge the material in the receptacle.

5. A device for dispensing a predetermined weight of material, said device comprising a base, a member journaled on said base to turn about a generally vertical axis, a horizontal plate mounted on said base, a receptacle resting on said plate and disposed laterally of said member, a flat, relatively wide belt having one end portion underlying and connected to the bottom of said receptacle and the other end portion connected to said member, said belt being relatively rigid in a horizontal direction and flexible in a vertical direction whereby the receptacle turns with the member but is free to move vertically relative thereto, a scale having a platform disposed adjacent said plate, mechanism for turning said member to move said receptacle across said plate and onto said platform, a first dispenser operable to deposit a quantity of material of a weight less than said predetermined weight in said receptacle while the latter is supported on said plate, a second dispenser operable when energized to deliver material to said receptacle when the receptacle is supported by said platform, and means responsive to said scale and operable to deenergize said second dispenser when said receptacle holds said predetermined weight of material.

6. A device for dispensing a predetermined weight of material, said device comprising a horizontal base, a member journaled on said base to turn about a generally vertical axis, a receptacle resting on said base and disposed laterally of said member, a flat, relatively wide belt connecting said receptacle and said member, said belt being relatively rigid in a horizontal direction and flexible in a vertical direction whereby the receptacle turns with the member but is free to move vertically relative thereto, a scale having a platform disposed adjacent said base, mechanism for turning said member to move said receptacle across said base and onto said platform, a first dispenser operable to deposit a quantity of material of a weight less than said predetermined weight in said receptacle while the latter is supported on said base, a second dispenser operable when energized to deliver material to said receptacle when the receptacle is supported by said platform, and means responsive to said scale and operable to deenergize said second dispenser when said receptacle holds said predetermined weight of material.

7. In a machine for dispensing a predetermined weight of material into a container, the combination of, a base, a member journaled on said base to turn about a generally vertical axis, a receptacle disposed laterally of said member, an element connecting said receptacle and said member, said element being relatively rigid in a horizontal direction and flexible in a vertical direction whereby the receptacle turns with said member but is free to move vertically relative thereto, indexing mechanism for turning said member intermittently to advance said receptacle through a succession of stations, a first dispenser disposed at one of said stations and operable to deposit a quantity of material of a weight less than said predetermined weight in said receptacle while the latter is dwelling at said station, a weighing scale having a platform disposed at a second and subsequent station and operable to support said receptacle, a second dispenser operable when energized to deposit material in said receptacle and disposed at said second station, means responsive to said weighing scale and operable when said receptacle holds said predetermined weight of material to deenergize said second dispenser and condition said indexing mechanism to advance the receptacle to a third station, an actuator operable to deliver a container to a position adjacent said third station and simultaneously to activate the conditioned indexing mechanism, and means at said third station for transferring the material from said receptacle to said container.

8. In a machine for dispensing a predetermined weight of material into a container, the combination of, a base, a member journaled on said base to turn about a generally vertical axis, a receptacle disposed laterally of said member, an element connecting said receptacle and said member, said element being relatively rigid in a horizontal direction and flexible in a vertical direction whereby the receptacle turns with said member but is free to move vertically relative thereto, indexing mechanism for turning said member intermittently to advance said receptacle through a plurality of stations, a weighing scale having a platform disposed at one of said stations and operable to support the receptacle at said station, a dispenser operable when energized to deposit material in said receptacle when the latter is supported by said platform, means responsive to said weighing scale and operable when said receptacle holds said predetermined weight of material to deenergize said dispenser and condition said indexing mechanism to advance the receptacle to a subsequent station, an actuator, operable to deliver a container to a position adjacent said subsequent station and simultaneously to activate the conditioned indexing mechanism, and means at said subsequent station for transferring the material from said receptacle to said container.

9. A device for dispensing a predetermined weight of material, said device comprising a base, a member journaled on said base to turn about a vertical axis, a plurality of receptacles angularly spaced around said axis, a plurality of flexible belts, one connecting each of said receptacles to said member and each being relatively wide to be rigid in a horizontal direction while being flexible in a vertical direction whereby the receptacles turn with the member but are free to move vertically relative thereto, indexing mechanism for turning said member to advance said receptacles successively through first, second and third stations, a first dispenser operable to deposit a quantity of material of a weight less than said predetermined weight in the receptacle at said first station, a second dispenser operable when energized to deposit material in the receptacle at said second station, a weighing scale having a platform supporting the receptacle at said second station, means responsive to said scale and operable to deenergize said second dispenser when said receptacle holds said predetermined weight of material, and means for emptying the receptacle at said third station.

10. A device for dispensing a predetermined weight of material, said device comprising a base, a member journaled on said base to turn about a vertical axis, a plurality of receptacles angularly spaced around said axis, a plurality of flexible elements, one connecting each of said receptacles to said member and each being relatively rigid in a horizontal direction and flexible in a vertical direction whereby the receptacles turn with the member but are free to move vertically relative thereto, indexing mechanism for turning said member to advance said receptacles successively through first, second and third stations, a first dispenser operable to deposit a quantity of material of a weight less than said predetermined weight in the receptacle at said first station, a second dispenser operable when energized to deposit material in the receptacle at said second station, a weighing scale having a platform supporting the receptacle at said second station, means responsive to said scale and operable to deenergize said second dispenser when said receptacle holds said predetermined weight of material, and means for emptying the receptacle at said third station.

11. A device for dispensing a predetermined quantity of material, said device comprising a base, a member journaled on said base to turn about a vertical axis, a receptacle disposed laterally of said member, a flexible element secured at spaced points to said member and to said receptacle, said element being relatively rigid in a horizontal direction and flexible in a vertical direction whereby the receptacle turns with the member but is free to move vertically relative thereto, mechanism for turning said member intermittently to advance said receptacle through a succession of stations, a first discharge mechanism disposed at one of said stations and operable to deposit in said receptacle a quantity of material less than said predetermined quantity, a weighing scale having a platform disposed at a second and subsequent station and operable to support said receptacle while the latter is dwelling at said second station, a second discharge mechanism at said second station operable when energized to deposit material in said receptacle, an actuator operable to energize said second discharge mechanism when said receptacle is dwelling on said platform and responsive to said weighing scale to deenergize the mechanism when the receptacle holds said predetermined quantity of material, and means operable to empty said receptacle at a third station.

12. A device for dispensing a predetermined weight of material, said device comprising a horizontal base, a member journaled on said base to turn about a generally vertical axis, a receptacle resting on said base and disposed laterally of said member, an element connecting said receptacle and said member, said element being relatively rigid in a horizontal direction and flexible in a vertical direction whereby the receptacle turns with the member but is free to move vertically relative thereto, a scale having a platform disposed adjacent said base, mechanism for turning said member to move said receptacle across said base and onto said platform, a first dispenser operable to deposit a quantity of material of a weight less than said predetermined weight in said receptacle while the latter is supported on said base, a second dispenser operable when energized to deliver material to said receptacle when the receptacle is supported by said platform, and means responsive to said scale and operable to deenergize said second dispenser when said receptacle holds said predetermined weight of material.

13. In a device for dispensing a predetermined weight of material, the combination of, a weighing scale having a generally horizontal platform, a base, a member mounted on said base to move relative thereto, a receptacle disposed adjacent said member, a flexible element secured at spaced points to said receptacle and to said member to cause the member to move the receptacle onto said platform while permitting the receptacle to rest freely on the platform, means supporting said receptacle as the latter moves to said platform, a dispenser operable when energized to deposit material in said receptacle when the receptacle is on said platform, a controller responsive to said weighing scale and operable to deenergize said dispenser when said receptacle holds said predetermined weight of material, and a second dispenser disposed in advance of said platform and operable to deposit a quantity of material of a weight less than said predetermined weight in said receptacle.

14. In a device for dispensing a predetermined weight of material, the combination of, a weighing scale having a generally horizontal platform, a base, a member mounted on said base to move relative thereto, a receptacle disposed adjacent said member, a flexible element secured at spaced points to said receptacle and to said member to cause the member to move the receptacle onto said platform while permitting the receptacle to rest freely on the platform, means supporting said receptacle as the latter moves to said platform, a dispenser operable when energized to deposit material in said receptacle when the receptacle is on said platform, and a controller responsive to said weighing scale and operable to deenergize said dispenser when said receptacle holds said predetermined weight of material.

References Cited in the file of this patent

UNITED STATES PATENTS

| | | |
|---|---|---|
| 13,397 | Postley | Aug. 7, 1855 |
| 493,796 | Smyser | Mar. 21, 1893 |
| 720,008 | Doble | Feb. 10, 1903 |
| 1,602,578 | Ingram | Oct. 12, 1926 |
| 2,821,354 | Kindseth | Jan. 28, 1958 |